United States Patent
Otsuki et al.

(10) Patent No.: US 7,381,501 B2
(45) Date of Patent: Jun. 3, 2008

(54) POLYMER ELECTROLYTE AND PROTON CONDUCTIVE MEMBRANE

(75) Inventors: Toshihiro Otsuki, Tokyo (JP); Nagayuki Kanaoka, Wako (JP); Masaru Iguchi, Wako (JP); Naoki Mitsuta, Wako (JP); Hiroshi Soma, Wako (JP)

(73) Assignees: JSR Corporation, Tokyo (JP); Honda Motor Co., Ltd., Tokyo (JP)

( * ) Notice: Subject to any disclaimer, the term of this patent is extended or adjusted under 35 U.S.C. 154(b) by 186 days.

(21) Appl. No.: 11/074,664

(22) Filed: Mar. 9, 2005

(65) Prior Publication Data
US 2005/0202299 A1    Sep. 15, 2005

(30) Foreign Application Priority Data
Mar. 10, 2004    (JP)    ............... 2004-067543

(51) Int. Cl.
*H01M 10/08*    (2006.01)
*H01M 6/18*    (2006.01)

(52) U.S. Cl. ............ 429/314; 429/33; 429/309; 252/62.2

(58) Field of Classification Search ........ 429/309, 429/314, 33; 252/62.2
See application file for complete search history.

(56) References Cited

U.S. PATENT DOCUMENTS

| | | | |
|---|---|---|---|
| 5,403,675 A | | 4/1995 | Ogata et al. |
| 6,555,626 B2 * | | 4/2003 | Goto et al. ............ 525/242 |
| 6,926,984 B2 * | | 8/2005 | Asano et al. ............ 429/32 |
| 6,933,068 B2 * | | 8/2005 | Asano et al. ............ 429/33 |
| 6,989,212 B2 * | | 1/2006 | Morishima et al. ...... 429/33 |
| 7,011,905 B2 * | | 3/2006 | Sakamoto et al. ....... 429/33 |
| 7,022,743 B2 * | | 4/2006 | Morishima et al. ...... 521/28 |
| 7,115,699 B2 * | | 10/2006 | Yamakawa et al. ...... 528/172 |

FOREIGN PATENT DOCUMENTS

| | | |
|---|---|---|
| DE | 102 01 691 A1 | 9/2005 |
| EP | 1 138 712 A2 | 10/2001 |
| EP | 1420473 * | 5/2004 |
| EP | 1 465 277 A | 10/2004 |

* cited by examiner

*Primary Examiner*—Mark Ruthkosky
(74) *Attorney, Agent, or Firm*—Arent Fox LLP

(57) ABSTRACT

A solid polymer electrolyte includes a polymer having a sulfonic group and shows high proton conductivity in a wide range of temperatures and humidities and is excellent in hot water resistance and chemical stability. A proton conductive membrane is composed of the electrolyte. The polymer electrolyte includes a polymer having a structural unit represented by the following formula (1a) or (1b):

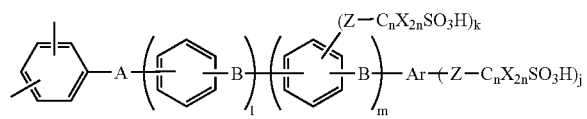

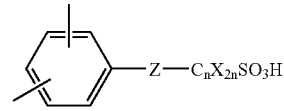

wherein A is a divalent electron-withdrawing group, B is a divalent electron-donating group or a direct bond, Ar is an aromatic group, Z is an oxygen or a sulfur atom, X is a hydrogen or a fluorine atom, j is an integer of 1 or greater, k is an integer of from 1 to 4, l is an integer of from 0 to 10, m is an integer of from 1 to 10, and n is an integer of from 1 to 8.

3 Claims, No Drawings

POLYMER ELECTROLYTE AND PROTON CONDUCTIVE MEMBRANE

FIELD OF THE INVENTION

The present invention relates to a solid polymer electrolyte composed of a polymer having a sulfonic group that is highly resistant to oxidation and hot water and is useful in fuel cells, water hydrolysis, sat hydrolysis, humidity sensors and gas sensors. The invention also relates to a proton conductive membrane comprising the electrolyte.

BACKGROUND OF THE INVENTION

Recently, solid electrolytes are used more often than the conventional electrolyte (aqueous) solutions. This is because firstly those solid electrolytes have good processability in application in electric and electronic components, and secondly there are trends for overall size and weight reduction of such components and further for power saving.

Proton conductive materials, both inorganic and organic, are known in the art. However, inorganic proton conductive compounds, such as uranyl phosphate hydrate, come with many difficulties when superposed as a conductive layer on a substrate or an electrode. For example, sufficient contact cannot be achieved in the interface between the conductive layer and the substrate or the like.

On the other hand, the organic proton conductive compounds include organic polymers that belong to the so-called cation exchange resins such as sulfonated vinyl polymers (ex. polystyrene sulfonic acid), perfluoroalkylsulfonic acid polymers represented by Nafion® (DuPont) and perfluoroalkylcarboxylic acid polymers, and that are obtained by introducing sulfonic or phosphoric groups in heat resistant polymers such as polybenzimidazole and polyether ether ketone (see, for example, Polymer Preprints, Japan, Vol. 42, No. 3, p. 730 (1993); Polymer Preprints, Japan, Vol. 42, No. 7, p. 2490-2492 (1993); and Polymer Preprints, Japan, Vol. 43, No. 3, p. 735-736 (1994)).

These organic polymers are generally used in the form of film. Their solvent solubility and thermoplasticity enable them to form a conductive membrane jointly on an electrode. However, many of the organic polymers are still insufficient in proton conductivity. In addition, they have poor service durability, reduce the proton conductivity at high temperatures (100° C. or above), have high humidity dependence, and are unsatisfactory in adhesion with the electrode. Further, because of the water-containing structure of these polymers, the conductive membranes are excessively swollen during operation, resulting in lowered strength and deformation. Accordingly, the organic polymers cause many problems in application to the electric and electronic components.

U.S. Pat. No. 5,403,675 proposes a solid polymer electrolyte comprising a sulfonated rigid-rod polyphenylene (namely, a sulfonated compound based on a polyarylene structure). This polymer mainly contains a polymer composed of phenylene chains that is obtained by polymerization of an aromatic compound, and the polymer has been sulfonated by reaction with a sulfonating agent to introduce the sulfonic groups. Although increasing the amount of the sulfonic groups introduced improves the proton conductivity, it also results in remarkably deteriorated mechanical characteristics such as toughness (for example, break elongation and folding resistance) and hot water resistance of the sulfonated polymer.

OBJECTS OF THE INVENTION

To solve the aforementioned problems of the background art, the present invention has an object of providing a solid polymer electrolyte composed of a polymer having a sulfonic group that shows high proton conductivity in a wide range of temperatures and humidities and is excellent in hot water resistance and chemical stability. It is a further object of the invention to provide a proton conductive membrane comprising the electrolyte.

MEANS FOR SOLVING THE PROBLEMS

A polymer electrolyte according to the present invention comprises a polymer having a structural unit represented by the following formula (1a) or (1b) and a structural unit represented by the following formula (2):

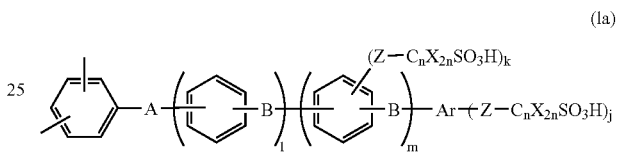
(1a)

wherein A is a divalent electron-withdrawing group, B is a divalent electron-donating group or a direct bond, Ar is an aromatic group, Z is an oxygen or a sulfur atom, X is a hydrogen or a fluorine atom, j is an integer of 1 or greater, k is an integer of from 1 to 4, l is an integer of from 0 to 10, m is an integer of from 1 to 10, and n is an integer of from 1 to 8;

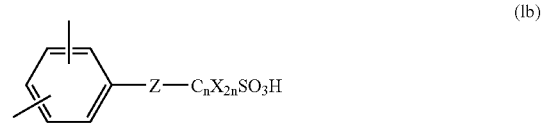
(1b)

wherein X is a hydrogen or a fluorine atom, Z is an oxygen or a sulfur atom, and n is an integer of from 1 to 8;

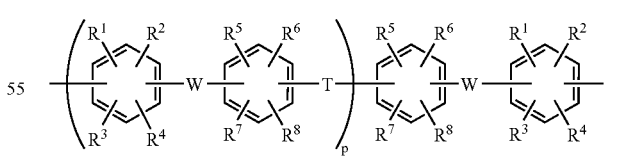
(2)

wherein $R^1$ to $R^8$, which may be the same or different, are each at least one atom or group selected from the group consisting of a hydrogen atom, a fluorine atom, an alkyl group, a fluorine-substituted alkyl group, an allyl group, an aryl group and a cyano group, W is a divalent electron-withdrawing group or a single bond, T is a divalent organic group or a single bond, and p is 0 or a positive integer.

EFFECTS OF THE INVENTION

The invention provides a solid polymer electrolyte that shows high proton conductivity in a wide range of temperatures and humidities and is excellent in hot water resistance and chemical stability.

A proton conductive membrane comprising the solid polymer electrolyte can be suitably used as electrolytes for primary and secondary batteries, solid polymer electrolytes for fuel cells and other conductive membranes for display elements, sensors, signaling media, solid condensers and ion exchange membranes.

PREFERRED EMBODIMENTS OF THE INVENTION

Hereinbelow, the polymer electrolyte and the proton conductive membrane according to the present invention will be described in detail.

The polymer electrolyte of the present invention comprises a polymer (hereinafter, the sulfonated polyarylene) that has a structural unit represented by the following formula (1a) or (1b) (hereinafter, the structural unit (1a) or (1b), or collectively the structural unit (1)) and a structural unit represented by the following formula (2) (hereinafter, the structural unit (2)).

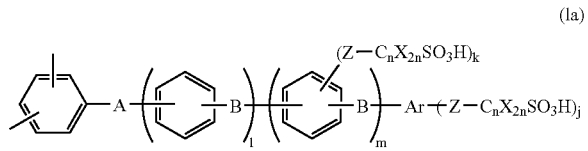

(1a)

In the formula (1a), A is a divalent electron-withdrawing group, with examples including $-CO-$, $-SO_2-$, $-SO-$, $-CONH-$, $-COO-$, $-(CF_2)_h-$ (where h is an integer of from 1 to 10) and $-C(CF_3)_2-$.

B is a direct bond or a divalent electron-donating group, with examples including $-(CH_2)-$, $-C(CH_3)_2-$, $-O-$, $-S-$, $-CH=CH-$, $-C\equiv C-$ and groups represented by:

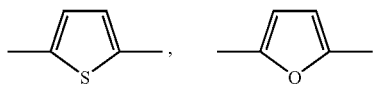

The electron-withdrawing group is defined as having a Hammett substituent constant of not less than 0.06 at the m-position and not less than 0.01 at the p-position of the phenyl group.

Ar denotes an aromatic group. Exemplary aromatic groups include phenyl, naphthyl, anthracenyl and phenanthyl groups, with the phenyl and naphthyl groups being preferred. Z is an oxygen or a sulfur atom, and X is a hydrogen or a fluorine atom. When two or more substituents $-Z-C_nX_{2n}SO_3H$ are substituted to the aromatic group, they may be the same or different from each other.

In the formula, j is an integer of 1 or greater; k is an integer of from 1 to 4; l is an integer of from 0 to 10, and preferably from 0 to 2; m is an integer of from 1 to 10, and preferably from 1 to 2; and n is an integer of from 1 to

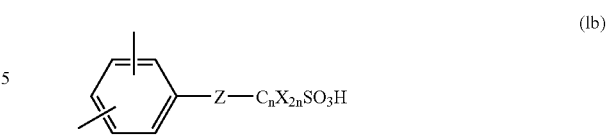

(1b)

wherein X, Z and n are as described in the formula (1a).

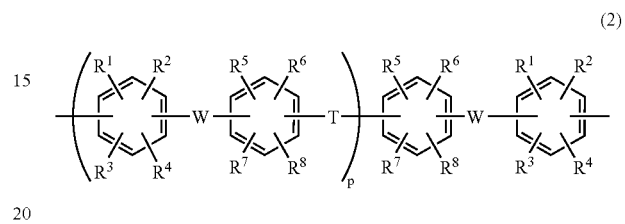

(2)

wherein $R^1$ to $R^8$, which may be the same or different, are each at least one atom or group selected from the group consisting of a hydrogen atom, a fluorine atom, an alkyl group, a fluorine-substituted alkyl group, an allyl group, an aryl group and a cyano group.

The alkyl groups include methyl, ethyl, propyl, butyl, amyl and hexyl groups, with the methyl and ethyl groups being preferred. The fluorine-substituted alkyl groups include trifluoromethyl, perfluoroethyl, perfluoropropyl, perfluorobutyl, perfluoropentyl and perfluorohexyl groups, with the trifluoromethyl and perfluoroethyl groups being preferred. The allyl groups include propenyl group. The aryl groups include phenyl and pentafluorophenyl groups.

W is a single bond or a divalent electron-withdrawing group, T is a single bond or a divalent organic group, and p is 0 or a positive integer of generally up to 100 and is preferably from 10 to 80.

The sulfonated polyarylene contains the structural unit (1a) or (1b) at 0.5 to 100 mol %, preferably 10 to 99.999 mol %, and the structural unit (2) at 99.5 to 0 mol %, preferably 90 to 0.001 mol %.

The sulfonated polyarylene may be produced by reacting a compound (A) that has a structural unit represented by the following formula (3a) or (3b) (hereinafter, the structural unit (3a) or (3b), or collectively the structural unit (3)) and the above structural unit (2), with a compound (B) or (C) represented by the following formula (4) or (5) respectively.

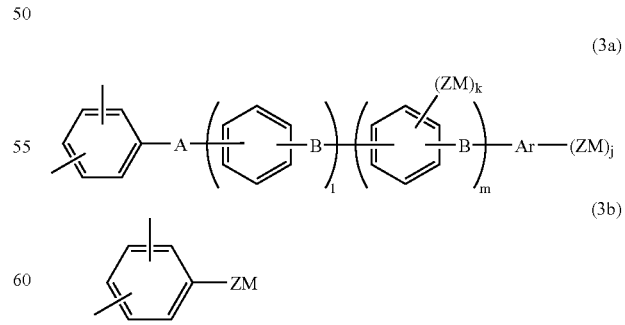

(3a)

(3b)

In the formula (3a), A, B, Ar, Z, j, k, l and m are as described in the formula (1a).

In the formulae (3a) and (3b), M is a hydrogen atom or an alkali metal atom such as sodium, potassium or lithium.

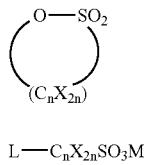 (4)

 (5)

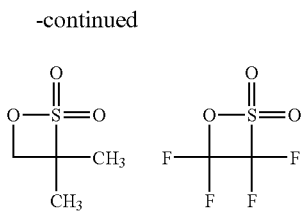

wherein X and n are as described in the formula (1a), M is as defined in the formula (3), and L is a chlorine, a bromine or an iodine atom.

Examples of the compounds (B) represented by the formula (4) include:

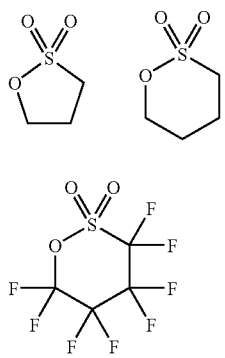

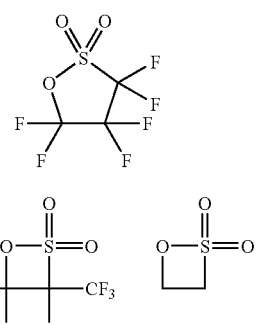

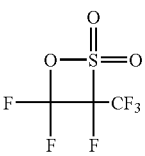

Examples of the compounds (C) represented by the formula (5) include $ClCH_2SO_3Na$, $ClCH_2CH_2SO_3Na$, $ClCH_2CH_2CH_2SO_3Na$, $ClCH_2CH_2CH_2CH_2SO_3Na$, $ClCF_2SO_3Na$, $ClCF_2CF_2SO_3Na$, $ClCF_2CF_2CF_2SO_3Na$ and $ClCF_2CF_2CF_2CF_2SO_3Na$.

Manipulating the number n in the formula (4) or (5) permits control of the position and quantity of the sulfonic groups introduced in the resultant sulfonated polyarylene.

The reaction between the compound (A) and the compound (B) or (C) may be performed such that the compound (A) and the compound (B) or (C) are dissolved in a solvent under basic conditions, as illustrated in the following formulae (where the compound (A) has the structural units (2) and (3b)):

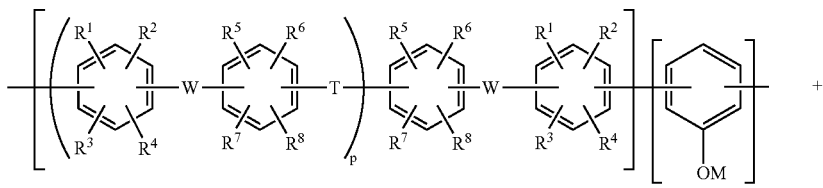

Compound (A)

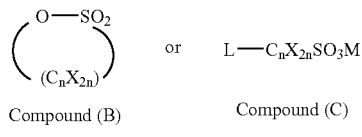

Compound (B)   Compound (C)   Under basic conditions →

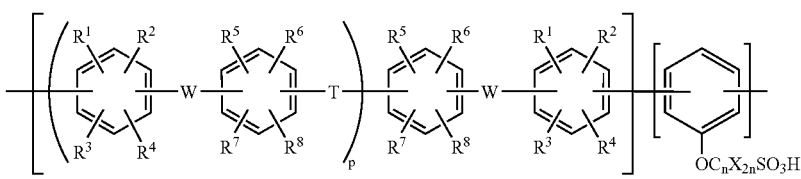

The compound (A) may be obtained by copolymerizing a compound represented by the following formula (6a) or (6b) (hereinafter, collectively the compound (6)) and a compound represented by the following formula (7) (hereinafter, the compound (7)). When $R^a$ in the compound (6) is a hydrocarbon group, copolymerization of the compound (6) and the compound (7) may be followed by removal of the hydrocarbon group $R^a$ to produce the compound (A).

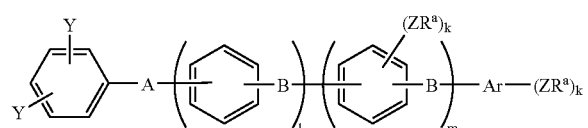

(6a)

(6b)

In the formula (6a), A, B, Ar, Z, j, k, l and m are as described in the formula (1a).

In the formulae (6a) and (6b), Y denotes a halogen atom other than fluorine (i.e., chlorine, bromine or iodine) or a group —$OSO_2Z$ (where Z is an alkyl, a fluorine-substituted alkyl or an aryl group), and $R^a$ denotes a hydrogen atom or a hydrocarbon group of 1 to 20 carbon atoms.

Specific examples of the hydrocarbon groups include linear hydrocarbon groups, branched hydrocarbon groups, alicyclic hydrocarbon groups and 5-membered heterocyclic hydrocarbon groups, such as methyl, ethyl, n-propyl, iso-propyl, tert-butyl, iso-butyl, n-butyl, sec-butyl, neopentyl, cyclopentyl, hexyl, cyclohexyl, cyclopentylmethyl, cyclohexylmethyl, adamantyl, adamantylmethyl, 2-ethylhexyl, bicyclo[2.2.1]heptyl, bicyclo[2.2.1]heptylmethyl, tetrahydrofurfuryl, 2-methylbutyl and 3,3-dimethyl-2,4-dioxolanemethyl groups. The hydrocarbon groups may contain an oxygen, a nitrogen or a sulfur atom. The oxygen-containing hydrocarbon groups include tetrahydro-2-pyranyl, methoxymethyl, ethoxyethyl and propoxymethyl groups, with the tetrahydro-2-pyranyl and methoxymethyl groups being preferable.

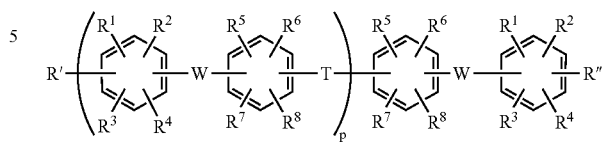

(7)

In the formula (7), R' and R" may be the same or different and are each a halogen atom other than fluorine or a group —$OSO_2Z$ (where Z is an alkyl, a fluorine-substituted alkyl or an aryl group). Indicated by Z, the alkyl groups include methyl and ethyl groups, the fluorine-substituted alkyl groups include trifluoromethyl group, and the aryl groups include phenyl and p-tolyl groups. $R^1$ to $R^8$, W, T and p are as described in the formula (2).

Exemplary compounds of the formula (7) in which p is 0 include 4,4'-dichlorobenzophenone, 4,4'-dichlorobenzanilide, bis(chlorophenyl)difluoromethane, 2,2-bis(4-chlorophenyl)hexafluoropropane, 4-chlorobenzoic acid-4-chlorophenyl, bis(4-chlorophenyl)sulfoxide, bis(4-chlorophenyl)sulfone, 2,6-dichlorobenzonitrile, 9,9-bis(4-hydroxyphenyl)fluorene, compounds corresponding to these compounds except that the chlorine atom is replaced with a bromine or an iodine atom, and compounds corresponding to the above compounds except that at least one of the halogen atoms at the 4-position is substituted at the 3-position.

Exemplary compounds of the formula (7) in which p is 1 include 4,4'-bis(4-chlorobenzoyl)diphenyl ether, 4,4'-bis(4-chlorobenzoylamino)diphenyl ether, 4,4'-bis(4-chlorophenylsulfonyl)diphenyl ether, 4,4'-bis(4-chlorophenyl)diphenyl ether dicarboxylate, 4,4'-bis[(4-chlorophenyl)-1,1,1,3,3,3-hexafluoropropyl]diphenyl ether, 4,4'-bis[(4-chlorophenyl)tetrafluoroethyl]diphenyl ether, compounds corresponding to these compounds except that the chlorine atom is replaced with a bromine or an iodine atom, compounds corresponding to the above compounds except that the halogen substitution occurs at the 3-position in place of the 4-position, and compounds corresponding to the above compounds except that at least one of the substituent groups at the 4-position in the diphenyl ether is substituted at the 3-position.

The compounds of the formula (7) further include 2,2-bis[4-{4-(4-chlorobenzoyl)phenoxy}phenyl]-1,1,1,3,3,3-hexafluoropropane, bis[4-{4-(4-chlorobenzoyl)phenoxy}phenyl]sulfone, and compounds represented by the following formulae:

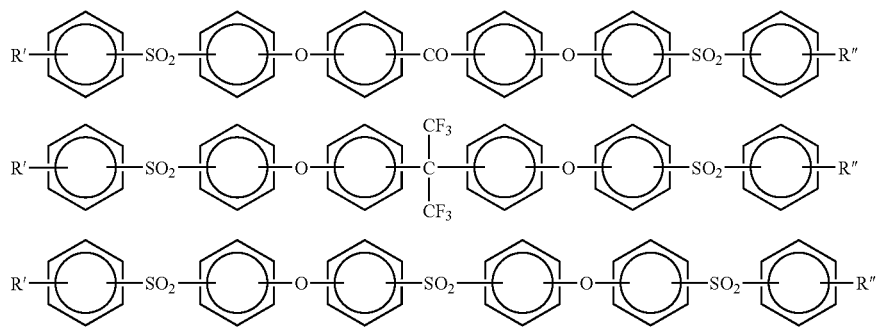

-continued

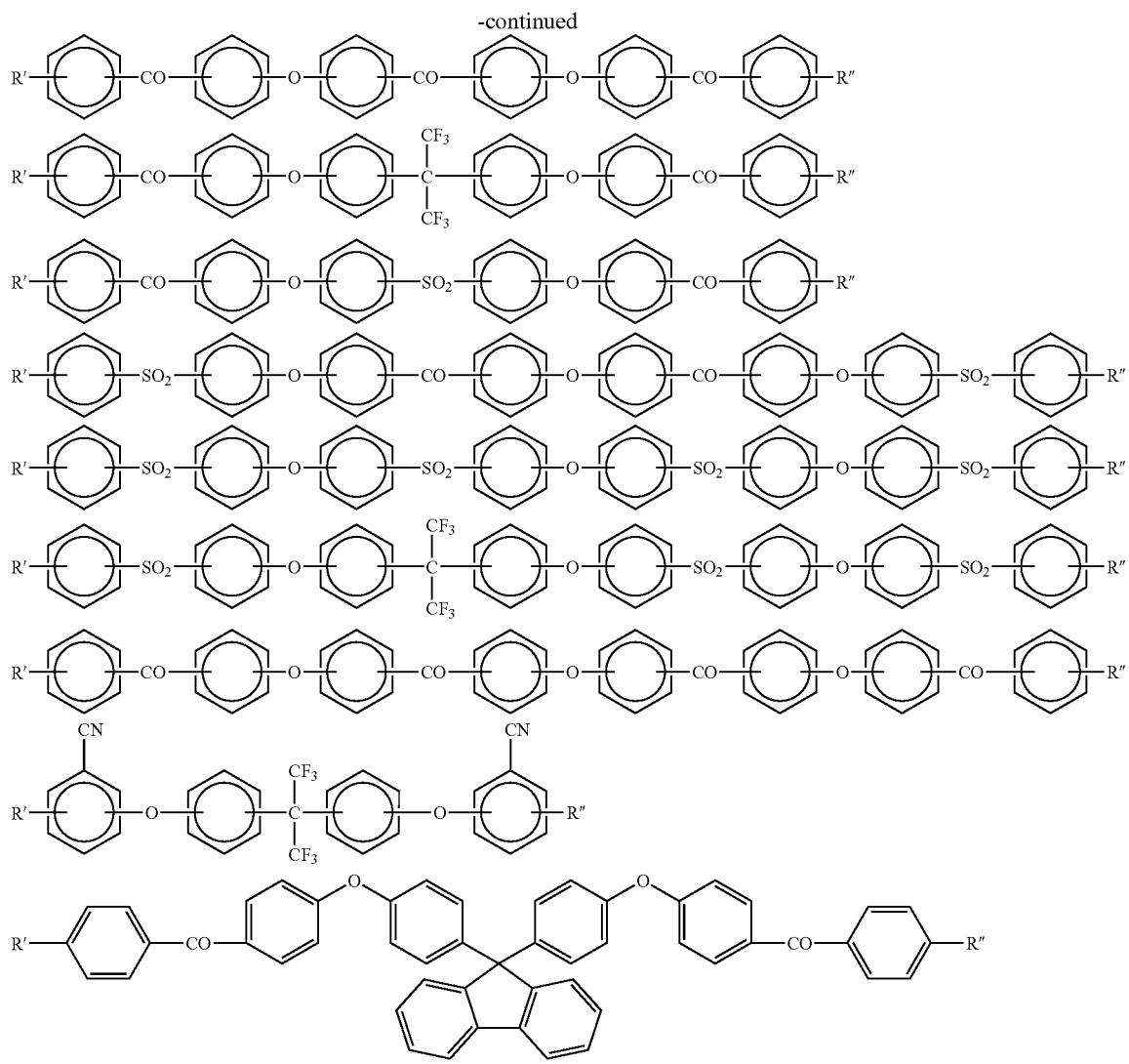

For example, the compounds represented by the formula (7) may be synthesized by the process given below.

First, an alkali metal such as lithium, sodium or potassium, or an alkali metal compound such as an alkali metal hydride, an alkali metal hydroxide or an alkali metal carbonate, is added to bisphenols combined together by the electron-withdrawing group thereby to convert them into a corresponding alkali metal salt of bisphenol. This reaction is made in a polar solvent of high dielectric constant, such as N-methyl-2-pyrrolidone, N,N-dimethylacetamide, sulfolane, diphenyl sulfone or dimethyl sulfoxide.

The alkali metal will be generally used in slight excess over the hydroxyl groups of the bisphenol, for example 1.1 to 2 times, and preferably 1.2 to 1.5 times the equivalent weight of the hydroxyl groups.

Thereafter, the alkali metal salt of bisphenol is reacted with a halogen-substituted (e.g., fluorine- or chlorine-substituted) aromatic dihalide compound which has been activated by the electron-withdrawing groups, in the presence of a solvent that can form an azeotropic mixture with water, such as benzene, toluene, xylene, hexane, cyclohexane, octane, chlorobenzene, dioxane, tetrahydrofuran, anisole or phenetole. Examples of the above halogen-substituted aromatic dihalide compounds include 4,4'-difluorobenzophenone, 4,4'-dichlorobenzophenone, 4,4'-chlorofluorobenzophenone, bis(4-chlorophenyl)sulfone, bis(4-fluorophenyl)sulfone, 4-fluorophenyl-4'-chlorophenylsulfone, bis(3-nitro-4-chlorophenyl)sulfone, 2,6-dichlorobenzonitrile, 2,6-difluorobenzonitrile, hexafluorobenzene, decafluorobiphenyl, 2,5-difluorobenzophenone and 1,3-bis(4-chlorobenzoyl)benzene. From the viewpoint of reactivity, the aromatic dihalide compound is desirably a fluorine compound. But taking the subsequent aromatic coupling reaction into account, the aromatic nucleophilic substitution reaction should be designed to take place so as to yield a molecule having a chlorine atom at its end(s).

The active aromatic dihalide compound may be used in an amount 2 to 4 times, and preferably 2.2 to 2.8 times the moles of the bisphenol. The reaction temperature is in the range of 60 to 300° C., and preferably 80 to 250° C. The reaction time ranges from 15 minutes to 100 hours, and preferably from 1 to 24 hours. Optimally, the active aromatic dihalide compound is a chlorofluoro compound as shown in the formula below that has two halogen atoms different in reactivity from each other. The use of this compound is advantageous in that the fluorine atom will preferentially undergo the nucleophilic substitution reaction with phenoxide so that the objective chlorine-terminated active compound may be obtained.

bis-phenoxy compound. The Friedel-Crafts reaction between the bis-phenoxy compound and the acylating agent chlorobenzoyl chloride is preferably carried out in the presence of an activator for the Friedel-Crafts reaction, such as aluminum chloride, boron trifluoride or zinc chloride. The

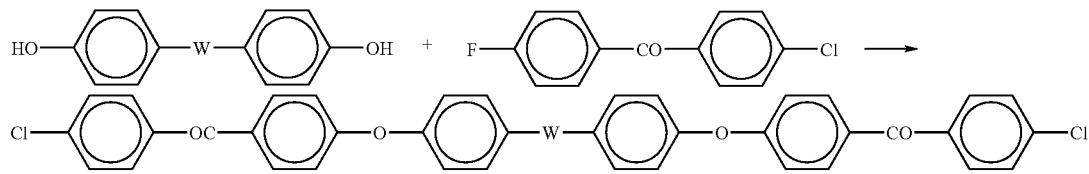

wherein W is as defined in the formula (7).

Alternatively, the nucleophilic substitution reaction may be carried out in combination with electrophilic substitution reaction to synthesize an objective flexible compound comprising the electron-withdrawing and electron-donating groups, as described in JP-A-H02-159.

Specifically, the aromatic bis-halide activated by the electron-withdrawing groups, such as bis(4-chlorophenyl)sulfone, is subjected to the nucleophilic substitution reaction with a phenol; thereafter the resultant bis-phenoxy compound is subjected to Friedel-Crafts reaction with 4-chlorobenzoyl chloride to give an objective compound.

The aromatic bis-halide activated by the electron-withdrawing groups used herein may be selected from the above-exemplified compounds. The phenol compound may be substituted, but is preferably unsubstituted from the viewpoints of heat resistance and flexibility. When substituted, the substituted phenol compound is preferably an alkali metal salt. Any of the alkali metal compounds listed above can be used in the substitution reaction for the phenol compound. The alkali metal compound may be used in an amount 1.2 to 2 times the moles of the phenol. In the reaction, the aforesaid polar solvent or the azeotropic solvent with water may be employed.

The chlorobenzoyl chloride is used in an amount 2 to 4 times, and preferably 2.2 to 3 times the moles of the Friedel-Crafts reaction activator is used in an amount 1.1 to 2 times the moles of the active halide compound such as the acylating agent chlorobenzoic acid. The reaction time is in the range of 15 minutes to 10 hours, and the reaction temperature is in the range of −20 to 80° C. As a solvent, chlorobenzene, nitrobenzene or the like that is inactive in the Friedel-Crafts reaction may be used.

The compound of the formula (7) in which p is 2 or greater may be synthesized by polymerization in accordance with the aforementioned procedure. In this case, a bisphenol, which can supply ether oxygen as the electron-donating group T in the formula (7), is combined with one or more electron-withdrawing groups W selected from >C=O, —SO$_2$— and >C(CF$_3$)$_2$ to give a bisphenol compound such as 2,2-bis(4-hydroxyphenyl)-1,1,1,3,3,3-hexafluoropropane, 2,2-bis(4-hydroxyphenyl)ketone or 2,2-bis(4-hydroxyphenyl)sulfone. The bisphenol compound is then converted into an alkali metal salt of bisphenol and is subjected to the substitution reaction with an excess of the activated aromatic halogen compound such as 4,4-dichlorobenzophenone or bis(4-chlorophenyl)sulfone, in the presence of a polar solvent such as N-methyl-2-pyrrolidone, N,N-dimethylacetamide or sulfolane. Examples of such compounds include those represented by the following formulae:

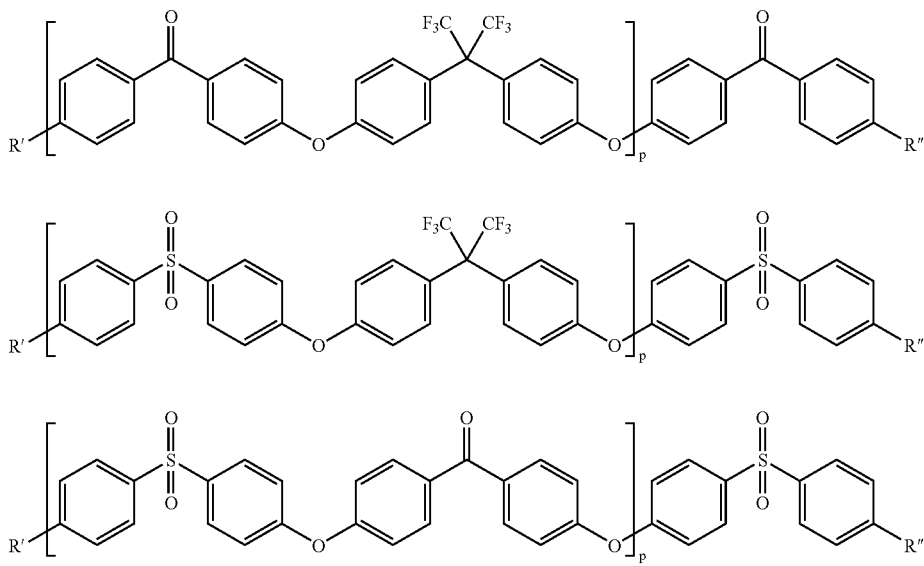

-continued

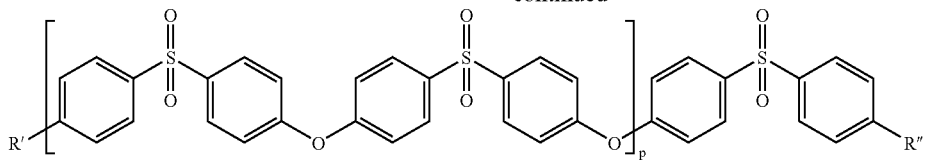

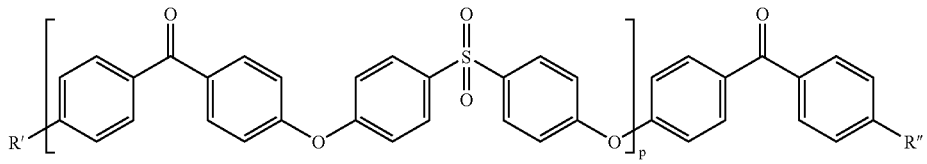

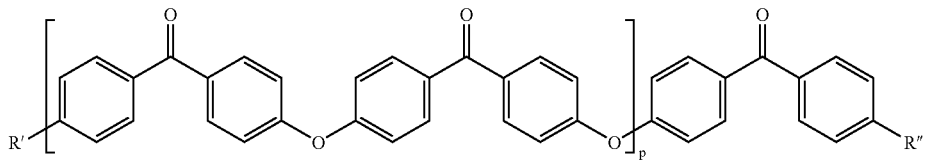

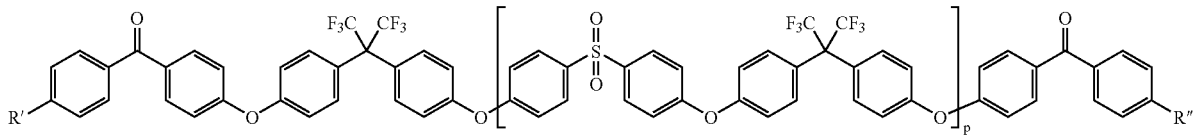

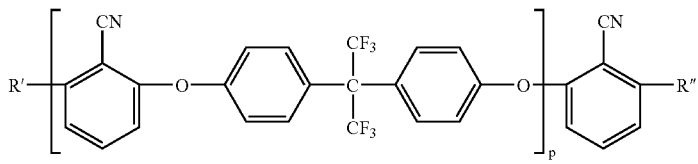

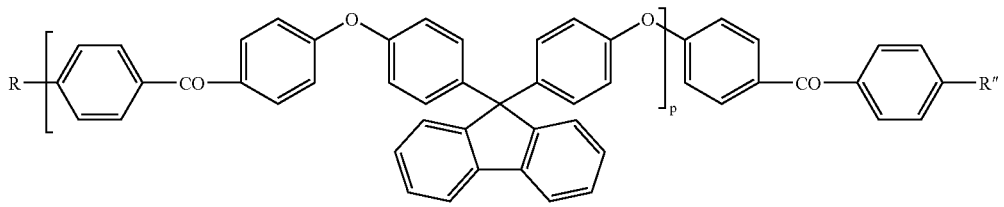

In the above formulae, p is 0 or a positive integer, generally up to 100, and is preferably from 10 to 80.

The compound (A) is synthesized by reaction between the compounds (6) and (7) in the presence of a catalyst. The catalyst used herein is a catalyst system containing a transition metal compound. This catalyst system essentially contains (i) a transition metal salt and a compound which functions as a ligand (hereinafter the ligand component), or a transition metal complex (including a copper salt) to which a ligand is coordinated, and (ii) a reducing agent. A "salt" may be added to increase the polymerization rate.

Examples of the transition metal salts include nickel compounds such as nickel chloride, nickel bromide, nickel iodide and nickel acetylacetonate; palladium compounds such as palladium chloride, palladium bromide and palladium iodide; iron compounds such as iron chloride, iron bromide and iron iodide; and cobalt compounds such as cobalt chloride, cobalt bromide and cobalt iodide. Of these, nickel chloride, nickel bromide, etc. are particularly preferred.

Examples of the ligand components include triphenylphosphine, 2,2'-bipyridine, 1,5-cyclooctadiene and 1,3-bis(diphenylphosphino)propane. Of these, triphenylphosphine and 2,2'-bipyridine are preferred. The ligand components may be used singly or in combination of two or more kinds.

Examples of the ligand-coordinated transition metal complexes include nickel chloride-bis(triphenylphosphine), nickel bromide-bis(triphenylphosphine), nickel iodide-bis (triphenylphosphine), nickel nitrate-bis(triphenylphosphine), nickel chloride(2,2'-bipyridine), nickel bromide(2, 2'-bipyridine), nickel iodide(2,2'-bipyridine), nickel nitrate (2,2'-bipyridine), bis(1,5-cyclooctadiene)nickel, tetrakis (triphenylphosphine)nickel, tetrakis(triphenylphosphite) nickel and tetrakis(triphenylphosphine)palladium. Of these, nickel chloride-bis(triphenylphosphine) and nickel chloride (2,2'-bipyridine) are preferred.

Examples of the reducing agents employable in the aforesaid catalyst system include iron, zinc, manganese, aluminum, magnesium, sodium and calcium. Of these, zinc, magnesium and manganese are preferable. These reducing agents may be used in a more activated form by contact with an acid, for example, an organic acid.

Examples of the "salts" employable in the catalyst system include sodium compounds such as sodium fluoride, sodium chloride, sodium bromide, sodium iodide and sodium sulfate; potassium compounds such as potassium fluoride, potassium chloride, potassium bromide, potassium iodide and potassium sulfate; and ammonium compounds such as tetraethylammonium fluoride, tetraethylammonium chloride, tetraethylammonium bromide, tetraethylammonium iodide and tetraethylammonium sulfate. Of these, sodium bromide, sodium iodide, potassium bromide, tetraethylammonium bromide and tetraethylammonium iodide are preferred.

In respect of the proportion of the above components, the transition metal salt or the transition metal complex is generally used in an amount of 0.0001 to 10 mol, and preferably 0.01 to 0.5 mol, per mol of the monomers combined (the compound (6) plus the compound (7), the same applies hereinafter). If the amount is less than 0.0001 mol, the polymerization may not proceed to a desired level. Contrary, the amount exceeding 10 mol may result in a lower molecular weight of the polymer.

When the catalyst system includes the transition metal salt and the ligand component, the ligand component is generally used in an amount of 0.1 to 100 mol, and preferably 1 to 10 mol, per mol of the transition metal salt. The amount less than 0.1 mol may cause insufficient catalytic activity. Contrary, the amount exceeding 100 mol may result in a lower molecular weight of the polymer.

The amount of the reducing agent is usually in the range of 0.1 to 100 mol, and preferably 1 to 10 mol, per mol of the monomers combined. If the reducing agent has an amount less than 0.1 mol, the polymerization may not proceed sufficiently. Contrary, the amount thereof exceeding 100 mol may lead to difficult purification of the resulting polymer.

When the "salt" is used, the amount thereof is usually in the range of 0.001 to 100 mol, and preferably 0.01 to 1 mol, per mol of the monomers combined. If the salt has an amount less than 0.001 mol, it often cannot provide sufficient effect of increasing the polymerization rate. Contrary, the amount thereof exceeding 100 mol may lead to difficult purification of the resulting polymer.

Exemplary polymerization solvents for use in the reaction between the compounds (6) and (7) include tetrahydrofuran, cyclohexanone, dimethyl sulfoxide, N,N-dimethylformamide, N,N-dimethylacetamide, N-methyl-2-pyrrolidone, γ-butyrolactone and N,N'-dimethylimidazolidinone. Of these, tetrahydrofuran, N,N-dimethylformamide, N,N-dimethylacetamide, N-methyl-2-pyrrolidone and N,N'-dimethylimidazolidinone are preferred. These polymerization solvents are desirably used after dried sufficiently.

The concentration of the monomers in the polymerization solvent is usually in the range of 1 to 90% by weight, and preferably 5 to 40% by weight.

The polymerization temperature is usually 0 to 200° C., and preferably 50 to 120° C. The polymerization time is usually 0.5 to 100 hours, and preferably 1 to 40 hours.

The sulfonated polyarylene produced as described above will generally contain the sulfonic groups in an amount of 0.3 to 3.0 meq/g, preferably 0.5 to 2.5 meq/g, and particularly preferably 0.6 to 2.0 meq/g. When the sulfonic group content exceeds 3.0 meq/g, water resistance may be drastically deteriorated to an unsatisfactory level. If the sulfonic group content is less than 0.3 meq/g, the proton conductivity may be insufficient.

The sulfonic group content may be manipulated by changing the types, amounts and combination of the compounds (6) and (7).

The sulfonated polyarylene has a weight-average molecular weight of 10,000 to 1,000,000, and preferably 20,000 to 800,000, as measured by gel permeation chromatography (GPC) in terms of polystyrene.

The solid polymer electrolyte of the invention comprises the aforesaid sulfonated polyarylene, and may further contain an additive as required. Suitable additives include anti-aging agents, preferably hindered phenol compounds with a molecular weight of not less than 500. Such anti-aging agents impart longer durability to the electrolyte.

The hindered phenol compounds employable in the invention include triethyleneglycol-bis[3-(3-t-butyl-5-methyl-4-hydroxyphenyl)propionate] (trade name: IRGANOX 245), 1,6-hexanediol-bis[3-(3,5-di-t-butyl-4-hydroxyphenyl)propionate] (trade name: IRGANOX 259), 2,4-bis-(n-octylthio)-6-(4-hydroxy-3,5-di-t-butylanilino)-3,5-triadine (trade name: IRGANOX 565), pentaerythrithyl-tetrakis[3-(3,5-di-t-butyl-4-hydroxyphenyl)propionate] (trade name: IRGANOX 1010), 2,2-thio-diethylene bis[3-(3,5-di-t-butyl-4-hydroxyphenyl)propionate] (trade name: IRGANOX 1035), octadecyl-3-(3,5-di-t-butyl-4-hydroxyphenyl)propionate] (trade name: IRGANOX 1076), N,N-hexamethylene bis(3,5-di-t-butyl-4-hydroxy-hydrocinnamide) (trade name: IRGANOX 1098), 1,3,5-trimethyl-2,4,6-tris(3,5-di-t-butyl-4-hydroxybenzyl)benzene (trade name: IRGANOX 1330), tris-(3,5-di-t-butyl-4-hydroxybenzyl)-isocyanurate (trade name: IRGANOX 3114) and 3,9-bis[2-[3-(3-t-butyl-4-hydroxy-5-methylphenyl)propionyloxy]-1,1-dimethylethyl]-2, 4,8,10-tetraoxaspiro[5.5]undecane (trade name: Sumilizer GA-80). The hindered phenol compounds will preferably be used in an amount of 0.01 to 10 parts by weight per 100 parts by weight of the sulfonated polyarylene.

The proton conductive membrane of the invention comprises the aforesaid polymer electrolyte. The proton conductive membrane may be produced by a known method, for example a casting method in which a uniform solution of the polymer electrolyte in an organic solvent is flow-cast over a substrate to form a film. The substrate used herein is not particularly limited and may be selected from those substrates commonly used in the solution casting methods. Examples thereof include plastic substrates and metal substrates. Preferably, thermoplastic resin substrates such as polyethyleneterephthalate (PET) films are used.

The solvents in which the polymer electrolyte is dissolved include polar solvents such as N-methyl-2-pyrrolidone (NMP), N,N-dimethylformamide, γ-butyrolactone, N,N-dimethylacetamide, dimethylsulfoxide, dimethylurea, dimethylimidazolidinone, sulfolane, methylene chloride, chloroform and tetrahydrofuran (THF). The solvents may be used singly or in combination of two or more kinds.

The solvent for dissolving the polymer electrolyte may be a mixture of the above polar solvent and an alcohol. Exemplary alcohols include methanol, ethanol, propyl alcohol, isopropyl alcohol, sec-butyl alcohol and tert-butyl alcohol. In particular, methanol is preferable since it permits an appropriately low solution viscosity over a wide range of proportions of the polymer. These alcohols may be used singly or in combination of two or more kinds.

When the polar solvent-alcohol mixture is used, the polar solvent constitutes 95 to 25% by weight, and preferably 90 to 25% by weight, and the alcohol constitutes 5 to 75% by weight, and preferably 10 to 75% by weight of the mixture (the total of these two is 100 wt %). This alcohol proportion leads to an appropriately low solution viscosity.

Although the concentration of the polymer electrolyte in the solution (i.e. the polymer concentration) depends on the molecular weight of the sulfonated polymer, it is generally from 5 to 40% by weight, and preferably from 7 to 25% by weight. The polymer concentration less than 5% by weight causes difficulties in producing the membrane in large thickness and results in easy occurrence of pinholes. On the other hand, when the polymer concentration goes over 40% by weight, the solution viscosity becomes so high that the film production will be difficult and further that the obtained film may have low surface smoothness.

The solution viscosity may vary depending on the molecular weight of the sulfonated polymer or the polymer concentration. Generally, it ranges from 2,000 to 100,000 mPa·s, and preferably from 3,000 to 50,000 mPa·s. When the viscosity is less than 2,000 mPa·s, the solution will have too high a fluidity and may spill out of the substrate during the membrane production. On the contrary, the viscosity over 100,000 mPa·s is so high that the solution cannot be extruded through a die and the flow-casting for the film production may be difficult.

The wet film obtained as described above may be soaked into water to substitute the remaining organic solvent in the film with water. This treatment leads to a reduced amount of the residual solvent in the proton conductive membrane.

Prior to the soak into water, the wet film may be predried. The predrying may be performed by exposing the wet film to a temperature of 50 to 150° C. for 0.1 to 10 hours.

Soaking the wet films in water may be carried out batchwise with respect to each sheet, or may be a continuous process wherein the films, which may be in the original form of laminate with the substrate film (for example PET film) as produced or which may be released from the substrate, are soaked in water and then wound sequentially. In the batchwise soaking, the films are suitably framed or fixed by similar means to prevent wrinkles from forming on the surface of treated films.

The soaking should be suitably made such that the wet film will contact with water that is at least 10 parts by weight, and preferably at least 30 parts by weight based on 1 part by weight of the wet film. This contact ratio is suitably as large as possible to minimize the amount of solvent remaining in the proton conductive membrane. In order to reduce the residual solvent amount in the proton conductive membrane, it is also effective to keep the concentration of the organic solvent in water at or below a certain level by renewing the water used in the soaking or by letting the water overflow. The in-plane distribution of the organic solvent within the proton conductive membrane may be effectively narrowed by homogenizing the organic solvent concentration in the water by stirring or the like.

When the wet film is soaked in water, the water preferably has a temperature of 5 to 80° C. Although the substitution between the organic solvent and water can take place at a higher rate as the water temperature rises, the water absorption of the film will also increase at higher temperatures. Accordingly, there is a concern that the proton conductive membrane has a rough surface after dried. In general, the water temperature is suitably in the range of 10 to 60° C. from the viewpoints of the substitution rate and easy handling.

The soaking time varies depending on the initial amount of residual solvent, the contact ratio and the water temperature. Generally, the soaking time ranges from 10 minutes to 240 hours, and preferably from 30 minutes to 100 hours.

When the water-soaked film is dried, a proton conductive membrane is obtained that has a less amount of residual solvent generally reduced to 5% by weight or below. Controlling the soaking conditions enables reduction of the residual solvent down to 1% by weight or below of the proton conductive membrane. For example, this further reduction is achieved when the wet film is soaked in water that is at least 50 parts by weight based on 1 part by weight of the wet film, at a water temperature of 10 to 60° C. for 10 minutes to 10 hours.

After the wet film has been soaked in water as described above, the film is dried at 30 to 100° C., preferably 50 to 80° C., for 10 to 180 minutes, preferably 15 to 60 minutes. Subsequently, it is vacuum dried at 50 to 150° C. and preferably at a reduced pressure of 500 to 0.1 mmHg for 0.5 to 24 hours. The proton conductive membrane according to the invention may be thus obtained.

The proton conductive membrane obtained by the method described in the invention will range in dry thickness from 10 to 100 μm, and preferably from 20 to 80 μm.

The proton conductive membrane of the invention can be suitably used as electrolytes for primary and secondary batteries, solid polymer electrolytes for fuel cells and other proton conductive membranes for display elements, sensors, signaling media, solid condensers and ion exchange membranes.

EXAMPLES

The present invention will be hereinafter described in greater detail by Examples presented below, but it should be construed that the invention is in no way limited to those Examples. In Examples, the following properties were measured as described below. The polymer films (specimens) used in the measurements were 40 μm thick films obtained by casting a solution of the sulfonated polyarylene obtained in each Example in N-methylpyrrolidone in 18% concentration.

1. Sulfonic Acid Equivalent Weight

The sulfonated polyarylene was washed until the neutrality was reached in the washings, and the free residual acids were removed, followed by sufficient washing and drying. A predetermined amount of the polyarylene was weighed out and was titrated using an NaOH standard solution and an indicator consisted of phenolphthalein dissolved in a THF/water mixed solvent. The sulfonic acid equivalent weight was determined from the point of neutralization.

2. Proton Conductivity

A 5 mm-wide strip specimen of the proton conductive membrane, holding 5 platinum wires (0.5 mm in diameter) at intervals of 5 mm on its surface, was placed in a thermo-hygrostat. Subsequently, the alternating current impedance between the platinum wires was measured at 85° C., 90% RH and 10 kHz. This measurement was carried out using a chemical impedance measuring system (NF Corporation) and thermo-hygrostat JW241 (Yamato Co., Ltd.). The alternating current resistance was measured in each case where the interwire distance was changed from 5 mm to 20 mm among the 5 platinum wires. The resistivity of the membrane was calculated by the following equation based on a gradient between the interwire distance and the resistance. The reciprocal number of resistivity was obtained as the alternating current impedance, from which the proton conductivity was calculated.

Resistivity $R$ ($\Omega \cdot cm$)=0.5 (cm)×membrane thickness (cm)×resistance/interwire distance gradient ($\Omega$/cm)

3. Thermal Decomposition Initiation Temperature

The sulfonated polyarylene was analyzed by TGA (nitrogen atmosphere, 20° C./min heating rate) to obtain a decomposition temperature as the thermal decomposition initiation temperature (° C.)

4. Hot Water Resistance

The 40 μm thick membrane specimen (sulfonated polymer film) was soaked in 95° C. hot water for 48 hours. The weight of the soaked film was expressed in percentage relative to the original weight (pre-soaking weight) as the weight retention (%).

5. Fenton's Reagent Resistance

A hydrogen peroxide solution was diluted to 3% concentration with pure water, and iron sulfate was dissolved therein so that the iron ion ($Fe^{2+}$) concentration became 20 ppm. In the solution, the membrane specimen (sulfonated polymer film) of a predetermined size was soaked at 45° C. for 20 hours. The weight of the soaked film was expressed in percentage relative to the original weight (pre-soaking weight) as the weight retention (%).

6. Molecular Weight

The polyarylene was analyzed by GPC using a tetrahydrofuran (THF) solvent to determine the weight-average and number-average molecular weights in terms of polystyrene.

Example 1

A flask was charged with 37.5 g (100 mmol) of a compound having the following formula ($A_1$-1), 100 g (1200 mmol) of 2H-dihydropyran and 100 ml of toluene. Under stirring, 1.5 g of a cation exchange resin (AMBERLYST 15) was added, followed by stirring at room temperature for 5 hours. Subsequently, the cation exchange resin was filtered off. The filtrate was washed with an aqueous sodium hydroxide solution and a saline solution, and was thereafter dried over magnesium sulfate, followed by evaporating the solvent. The resultant solid was recrystallized in toluene to afford 24.5 g of a compound represented by the following formula ($A_1$-2) (45% yield)

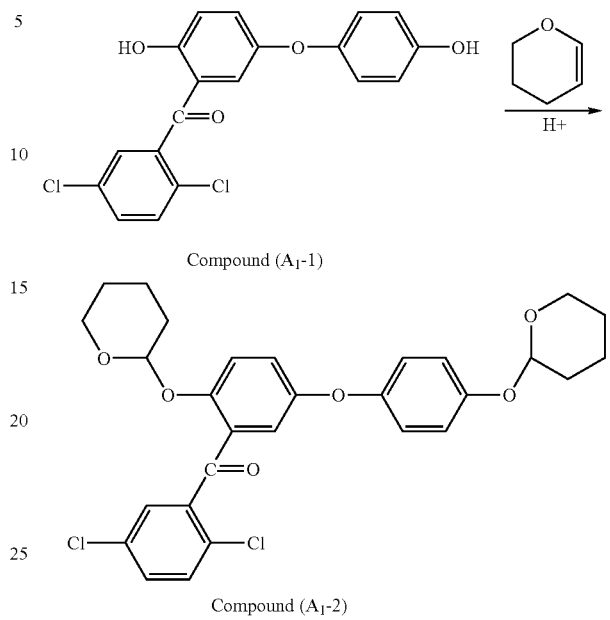

Compound ($A_1$-1)

Compound ($A_1$-2)

A 500-ml flask equipped with a stirring blade, a thermometer and a nitrogen inlet tube was charged with 52.4 g (96.5 mmol) of the compound ($A_1$-2), 39.2 g (3.5 mmol) of a compound having the following formula ($A_2$) (number-average molecular weight: 11,200), 1.96 g (3 mmol) of bis(triphenylphosphine)nickel dichloride, 1.95 g (13 mmol) of sodium iodide, 10.49 g (40 mmol) of triphenylphosphine and 15.7 g (240 mmol) of zinc, followed by vacuum drying. After the flask had been purged with dry nitrogen, 200 ml of N,N-dimethylacetamide (DMAc) was added to initiate polymerization. During the polymerization, the temperature of the reaction liquid was controlled in the range of 70 to 90° C. After the lapse of 3 hours, the reaction liquid was diluted by addition of 200 ml of DMAc, and the insolubles were filtered off. Thus, a polymer solution filtrate was obtained. A slight amount of the polymer solution filtrate was collected and was poured into methanol to precipitate the polymer. The precipitate was separated by filtration and was dried to give a solid. The $^1$H-NMR spectrum of the solid confirmed the presence of a tetrahydro-2-pyranyl group, and the possible compound structure was identified as the formula (A'-1) given below.

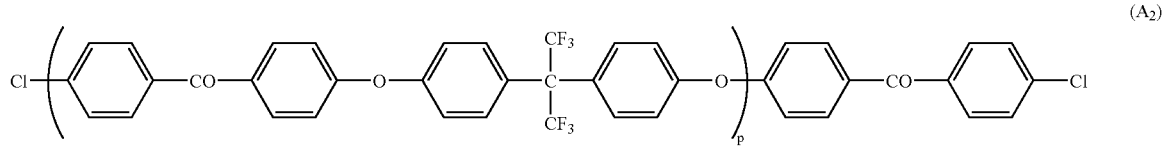

($A_2$)

-continued

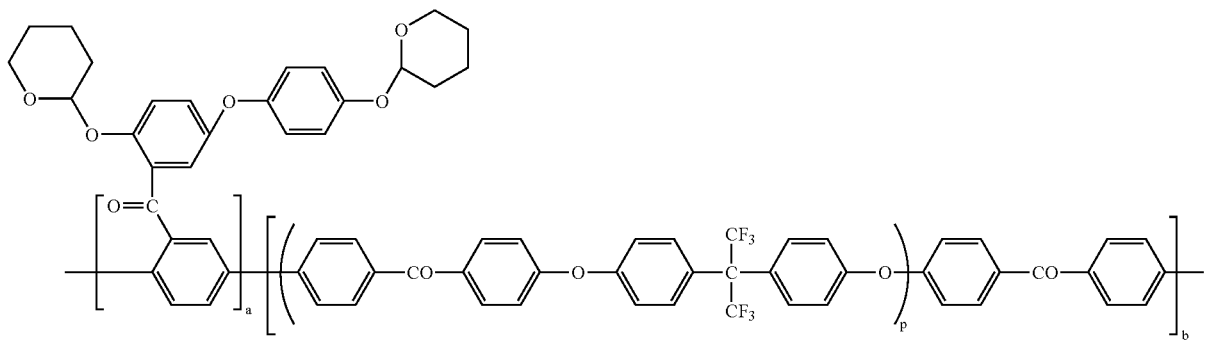
(A'-1)

The remaining polymer solution filtrate was poured into 1.5 l of methanol containing 10% by volume of concentrated hydrochloric acid to precipitate the polymer. The precipitate was separated by filtration and the solid was dried to afford 55 g of a polymer having a hydroxyl group, represented by the following formula (A-1)

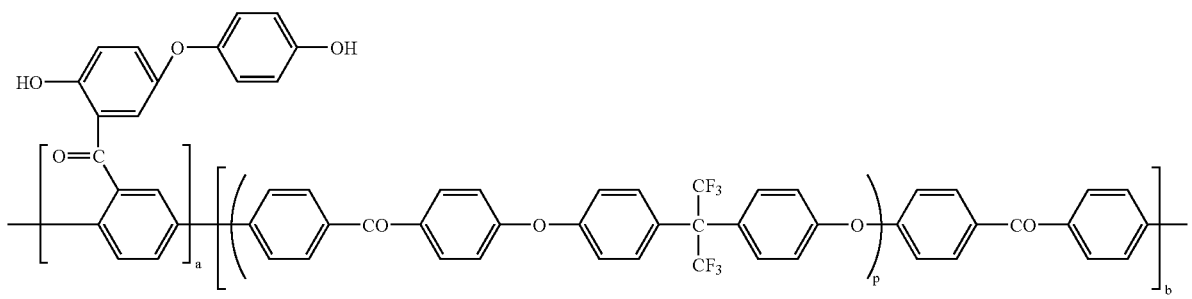
(A-1)

Subsequently, 20 g of the compound (A-1) was added to 250 ml of N,N-dimethylacetamide (DMAc) and the mixture was stirred at 100° C. to give a solution. Thereafter, 1.1 g (133 mmol) of lithium hydride was added, followed by stirring for 2 hours. Further, 16.2 g (133 mmol) of propanesultone (B-1) was added, and reaction was performed for 8 hours. The insolubles of the reaction liquid were filtered off, and the filtrate was poured into 1N hydrochloric acid to precipitate the polymer. The precipitated polymer was washed with 1N hydrochloric acid and was thereafter washed with ion exchange water until the pH reached neutrality. The polymer was dried at 75° C. to afford 27 g of powder of a sulfonated polyarylene (compound (C)).

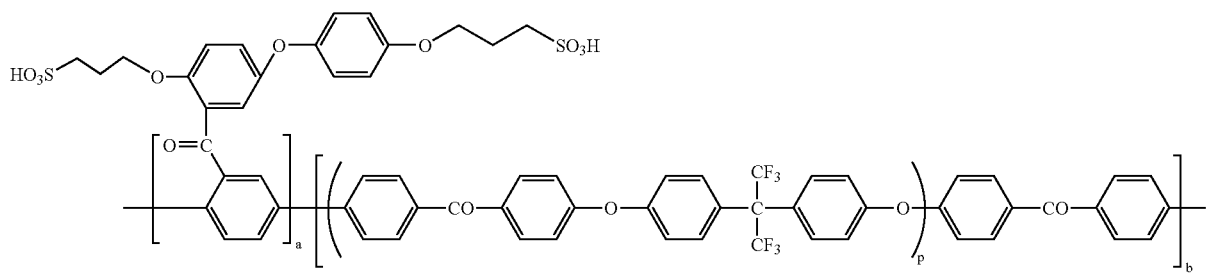
(C)

Example 2

A flask was charged with 16.3 g (100 mmol) of 2,5-dichlorophenol, 100 g (1200 mmol) of 2H-dihydropyran and 100 ml of toluene. Under stirring, 1.5 g of a cation exchange resin (AMBERLYST 15) was added, followed by stirring at room temperature for 5 hours. Subsequently, the cation exchange resin was filtered off. The filtrate was washed with an aqueous sodium hydroxide solution and a saline solution, and was thereafter dried over magnesium sulfate, followed by evaporating the solvent. The resultant solid was recrystallized in toluene to afford 12.2 g of a compound represented by the formula ($A_3$-2) (47% yield)

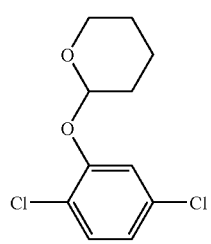

($A_3$-2)

A 500-ml flask equipped with a stirring blade, a thermometer and a nitrogen inlet tube was charged with 24.1 g (97.5 mmol) of the compound ($A_3$-2), 28.0 g (2.5 mmol) of a compound having the formula ($A_2$) (number-average molecular weight: 11,200), 1.96 g (3 mmol) of bis(triphenylphosphine)nickel dichloride, 1.95 g (13 mmol) of sodium iodide, 10.5 g (40 mmol) of triphenylphosphine and 15.7 g (240 mmol) of zinc, followed by vacuum drying. After the flask had been purged with dry nitrogen, 200 ml of N,N-dimethylacetamide (DMAc) was added to initiate polymerization. During the polymerization, the temperature of the reaction liquid was controlled in the range of 70 to 90° C. After the lapse of 3 hours, the reaction liquid was diluted by addition of 200 ml of DMAc, and the insolubles were filtered off. Thus, a polymer solution filtrate was obtained. A slight amount of the polymer solution filtrate was collected and was poured into methanol to precipitate the polymer. The precipitate was separated by filtration and was dried to give a solid. The $^1$H-NMR spectrum of the solid confirmed the presence of a tetrahydro-2-pyranyl group, and the possible compound structure was identified as the formula (A'-2) given below.

The remaining polymer solution filtrate was poured into 1.5 l of methanol containing 10% by volume of concentrated hydrochloric acid to precipitate the polymer. The precipitate was separated by filtration and the solid was dried to afford 34 g of a polymer having a hydroxyl group, represented by the following formula (A-2).

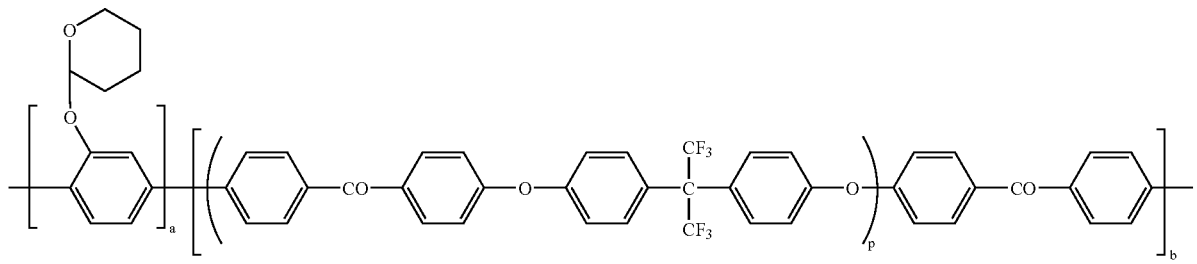

(A'-2)

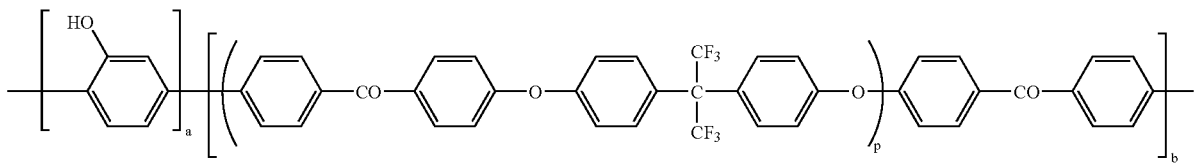

(A-2)

Subsequently, 20 g of the polymer (A-2) was added to 250 ml of N,N-dimethylacetamide (DMAC) and the mixture was stirred at 100° C. to give a solution. Thereafter, 1.06 g (133 mmol) of lithium hydride was added, followed by stirring for 2 hours. Further, 16.2 g (133 mmol) of propanesultone was added, and reaction was performed for 8 hours. The insolubles of the reaction liquid were filtered off, and the filtrate was poured into 1N hydrochloric acid to precipitate the polymer. The precipitated polymer was washed with 1N hydrochloric acid and was thereafter washed with distilled water until the pH reached neutrality. The polymer was dried at 75° C. to afford 28 g of powder of a sulfonated polyarylene represented by the following formula (D)

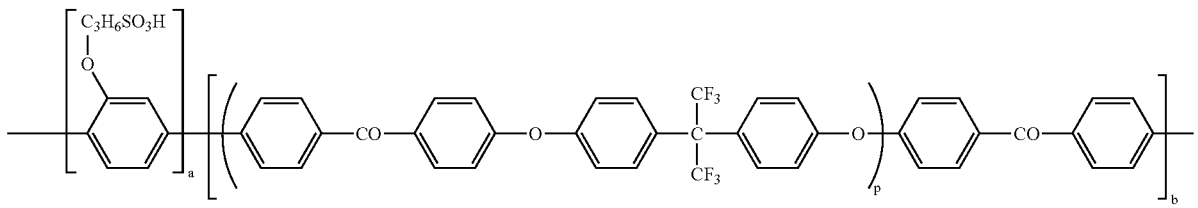

(D)

Properties of the sulfonated polyarylenes obtained in Examples 1 and 2 are shown in Table 1.

TABLE 1

| Test item | Unit | Ex. 1 | Ex. 2 |
| --- | --- | --- | --- |
| Sulfonic acid equivalent weight | meq/g | 2.00 | 1.90 |
| Proton conductivity | S/cm | 0.26 | 0.22 |
| Hot water resistance (weight retention) | % | 100 | 100 |
| Thermal decomposition initiation temperature | ° C. | 200 | 200 |
| Fenton's reagent resistance (weight retention) | % | 98 | 95 |

What is claimed is:

1. A polymer electrolyte comprising a polymer having a structural unit represented by the following formula (1) and a structural unit represented by the following formula (2):

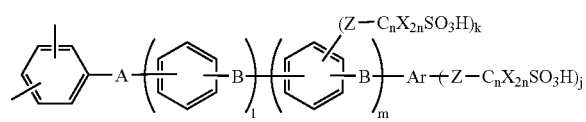

(1)

wherein A is a divalent electron-withdrawing group, B is a divalent electron-donating group or a direct bond, Ar is an aromatic group, Z is an oxygen or a sulfur atom, X is a hydrogen or a fluorine atom, j is an integer of 1 or greater, k is an integer of from 1 to 4, l is an integer of from 0 to 10, m is an integer of from 1 to 10, and n is an integer of from 1 to 8;

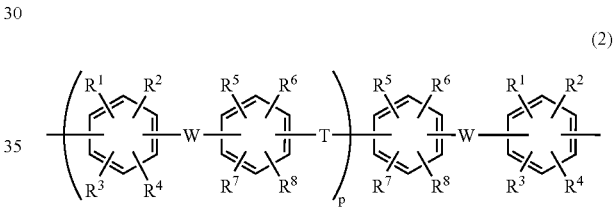

(2)

wherein $R^1$ to $R^8$, which may be the same or different, are each at least one atom or group selected from the group consisting of a hydrogen atom, a fluorine atom, an alkyl group, a fluorine-substituted alkyl group, an allyl group, an aryl group and a cyano group, W is a divalent electron-withdrawing group or a single bond, T is a divalent organic group or a single bond, and p is 0 or a positive integer.

2. The polymer electrolyte according to claim 1, wherein the polymer has a sulfonic group content in the range of 0.3 to 3 meq/g, and wherein structural unit (1) is contained at 10 to 99.999 mol % and structural unit (2) is contained at 90 to 0.001 mol %.

3. A proton conductive membrane comprising the polymer electrolyte of claim 1 or 2.

* * * * *